Oct. 10, 1950     D. A. FEIL     2,525,025

HIGH VACUUM DISTILLATION APPARATUS

Filed Dec. 26, 1947     2 Sheets-Sheet 1

INVENTOR
*Delmar A. Feil*
BY *Benjamin Sweedler*
ATTORNEY

Oct. 10, 1950     D. A. FEIL     2,525,025
HIGH VACUUM DISTILLATION APPARATUS

Filed Dec. 26, 1947     2 Sheets—Sheet 2

INVENTOR
Delmar A. Feil
BY
Benjamin Sweedler
ATTORNEY

Patented Oct. 10, 1950

2,525,025

UNITED STATES PATENT OFFICE 2,525,025

HIGH VACUUM DISTILLATION APPARATUS

Delmar A. Feil, Snyder, N. Y., assignor to Allied Chemical & Dye Corporation, New York, N. Y., a corporation of New York Application December 26, 1947, Serial No. 793,863

2 Claims. (Cl. 202—205)

The present invention relates to distillation apparatus, and more particularly to high vacuum unobstructed path distillation apparatus.

It is an object of this invention to provide a high vacuum still having exceptionally high distillation capacity and this with minimum pressure drop and a minimum of liquid entrainment by the vapors generated within the still when leaving the still. By "pressure drop" is meant the difference in pressure between the vapor pressure near the bottom of the still and that near the vapor outlet at or close to the top of the still.

Another object is to provide a still which is simple in design, relatively inexpensive to construct and maintain and efficient in operation.

A further object is to provide a still for the distillation of materials which tend to decompose when subjected to elevated temperatures, for example, materials such as alkyl benzenes produced by condensing a benzene hydrocarbon, such as benzene, toluene, etc., with a halogenated polycomponent, non-aromatic hydrocarbon mixture, as, for example, a chlorinated kerosene fraction in the presence of aluminum chloride or other Friedel and Crafts condensing agent, which still effects the distillation of such material with a minimum of decomposition producing undesired degradation products.

Other objects and advantages of this invention will be apparent from the following detailed description thereof.

In accordance with this invention the still comprises a squat housing, e. g., a cylindrical housing having a diameter substantially greater than its height. This housing desirably has an inclined bottom provided with a centrally disposed liquid outlet, and has the side walls and bottom heated, e. g., jacketed to provide for flow of a heating medium through the jacket to heat the side walls and bottom. A distributor is positioned near the top of the housing for introducing the distilland uniformly distributed throughout the top in the form of a sheet, film or spray, which strikes the heated side walls near the top thereof, the unvaporized liquid flowing downwardly along the heated side walls. A baffle, such as a helical baffle, is positioned on the bottom to provide an extended path through which unvaporized liquid flows before reaching the bottom outlet, thereby insuring maximum vaporization of the liquid. The interior of the housing below the distributor and above the baffle on the bottom is preferably devoid of obstructions. Accordingly, the vapors produced in the still in flowing to the vapor outlet pass through the falling liquid particles and the curtain or spray of liquid produced by the distributor unimpeded by baffles or other obstructions. A baffle is preferably positioned in front of the vapor outlet to remove entrained liquid from the vapors flowing into this outlet. This baffle, in the preferred embodiment, is the only obstruction in the path of flow of the vapors produced in the still to the vapor outlet, which communicates through a condenser with a vacuum pump.

The design of the still hereinabove described results in improved wetting of the heated surface with liquid to be distilled with consequent improvement in use of the available heating area and in the distillation capacity of the still. Further it shortens the period of exposure of the distilland to elevated temperatures, minimizing undesired decomposition thereof. Moreover it results in relatively low vapor velocities within the still eliminating the necessity of employing an enlarged entrainment space at the top of the still or other devices for entrainment separation which greatly increase the cost of the still. By dimensioning the housing as herein disclosed and by having the housing completely unobstructed, except for the baffle disposed immediately in front of the vapor outlet, a minimum pressure drop takes place. This is a very important factor in the distillation of easily decomposable materials, such as keryl benzenes, which in order to avoid excessive decomposition must be distilled at absolute pressures below 20 mm. of mercury and preferably below 5 mm.

In the accompanying drawings forming a part of this specification and showing for purposes of exemplification preferred forms of this invention without limiting the claimed invention to such illustrative instances, Figure 1 is a vertical section through a still embodying this invention;

Figure 1:
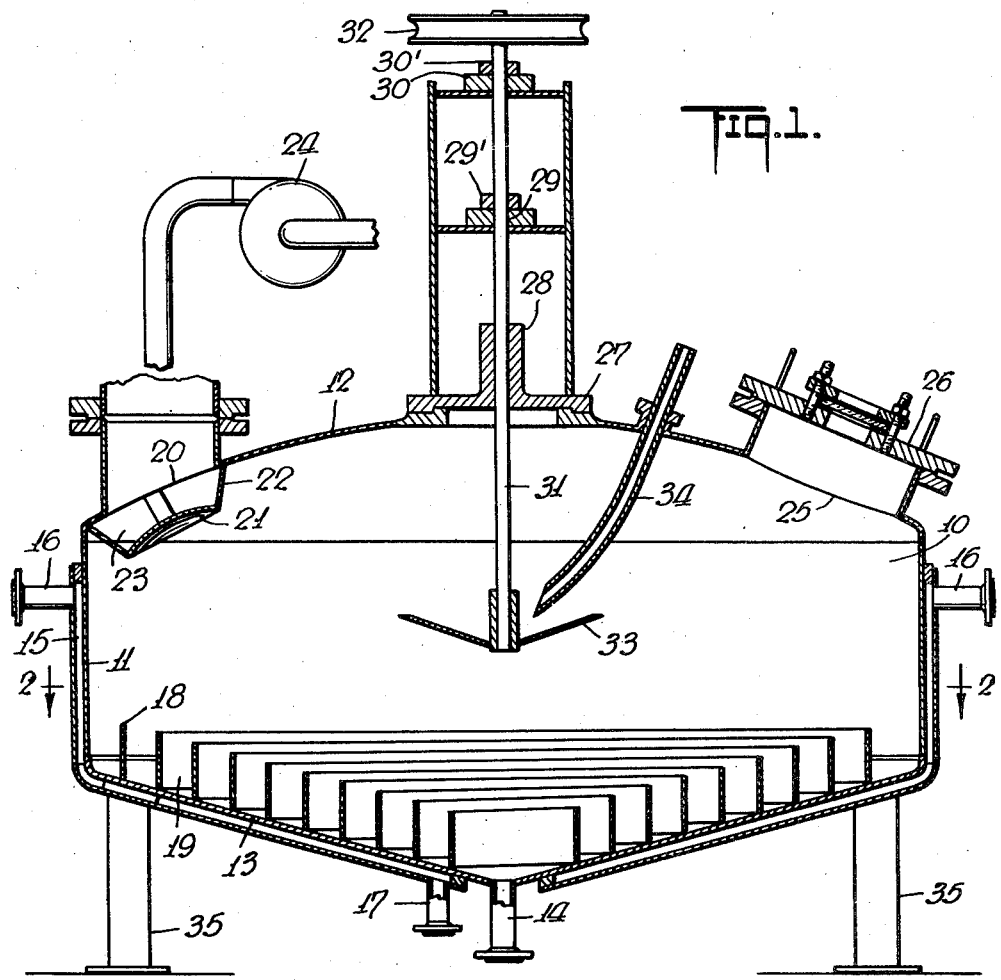

Referring to the drawings 10 indicates the housing of the still comprising cylindrical side walls 11, dome top 12 and conical bottom 13 provided with a centrally disposed discharge outlet 14, i. e., the outlet 14 is positioned at the apex of the conical bottom which is coincident with the longitudinal axis of the housing. The outlet 14 is therefore spaced remotely from the side walls 11. The diameter of the cylinder defined by side walls 11 is substantially greater, i. e., at least twice as great as the vertical height of the side walls 11, desirably this diameter is 3 or 4 times the height of the vertical side walls.

A heating jacket 15 supplies heat to side walls 11 and bottom 13; this heating jacket, as shown in Figure 1, extends from near the top of the side walls 11 downwardly along these side walls to a point close to the discharge outlet 14. This heating jacket is provided with top inlets 16 for supplying a heating medium, such as steam or a mixture of biphenyl and diphenyl oxide, which is circulated through the jacket and withdrawn through outlet 17.

Conical bottom 13 is inclined at a small angle to the horizontal, as shown in Figure 1, preferably this angle of inclination is less than 30° to the horizontal. A helical baffle 18 is positioned on the bottom, for example, by welding the lower edges of a helical metal strip to the bottom to provide a helical path 19 leading from the side walls 11 to the discharge outlet 14. Instead of the continuous helical baffle disclosed in Figures 1 and 2, a discontinuous or interrupted baffle may be employed to provide interconnected paths of flow for the material passing over the heated bottom from the side walls to the discharge outlet 14. By having the bottom 13 inclined at an angle of less than 30° to the horizontal a minimum number of turns of the spiral baffle 18 is required to insure maximum coverage of the heated bottom by the distilland flowing thereover; also the distilland is caused to flow over the heated bottom in a shallow stream approaching film thickness, facilitating heat transfer and promoting vaporization.

Top 12 of the still is provided with a vapor outlet 20. Positioned immediately in front of outlet 20 is a dished baffle 21 suitably secured as by spaced straps 22 having one end welded to the baffle 21 and the other end to the top 12 and providing openings or spaces 23 through which the vapors flow into the outlet 20. Baffle 21 serves to remove entrained liquid from the vapors flowing into outlet 20 and causes this liquid to flow downwardly through the rising vapor stream. Outlet 20 communicates through a condenser (not shown) with a vacuum pump 24 of any well known type designed to provide high vacuum, i. e., an absolute pressure less than 20 mm. of mercury, preferably less than 5 mm. of mercury, within the housing 10. At the opposite end of the top 12 of the housing from that containing the outlet 20 a manhole opening 25 is provided closed by a suitable cover 26 which when open permits access to the interior of the housing.

A plate 27 is mounted on the top of cover 12 and is provided with a stuffing box 28. Spaced bearings 29 and 30 are suitably supported on the top of the housing. A shaft 31 is rotatably mounted in bearings 29 and 30 and stuffing box 28, the axis of this shaft coinciding with the longitudinal axis of housing 10. Adjustable collars 29' and 30' rest on bearings 29 and 30, respectively, support shaft 31 and permit adjusting the distance the shaft extends within housing 10. Shaft 31 has keyed to one end a driving pulley 32 and has secured to the other end disposed within housing 10 a conical distributor 33. A supply pipe 34 extends through the top 12 for supplying distilland to distributor 33.

The still hereinabove described is supported by suitable supports or legs 35 resting on a floor or foundation and fastened to the heating jacket or other portion of the still near the top of the onical bottom.

In operation housing 10 is first evacuated by pump 24. Distributor 33 is then rotated at a high rate of speed by driven pulley 32 such that the distilland supplied thereto by pipe 34 is thrown by centrifugal force in the form of a curtain or spray extending uniformly throughout the cross sectional extent of the interior of housing 10. A portion of this material is vaporized as it enters the chamber and moves through the unobstructed space within housing 10 and the remainder strikes the side walls 11 near the top of the jacketed portion. This material flows downwardly along the heated side walls 11 and through the extended helical path 19, unvaporized material flowing continuously through the discharge outlet 14. The vapors thus produced rise through the unobstructed space within housing 10 and are scrubbed and fractionated as they pass through the curtain or spray of distilland introduced by the distributor 33 and leave housing 10 through vapor outlet 20 after removal of entrained liquid by baffle 21. The flow of the vapors through the curtain or spray of distilland provides considerable fractionation, low boiling constituents of the curtain or spray of liquid are volatilized by the heat of the ascending vapors and high boiling undesirable constituents of the vapors are condensed by contact with the relatively cold curtain or spray of liquid introduced into the still. The vapors passing through outlet 20 are condensed in the condenser communicating with this outlet.

Figure 2:
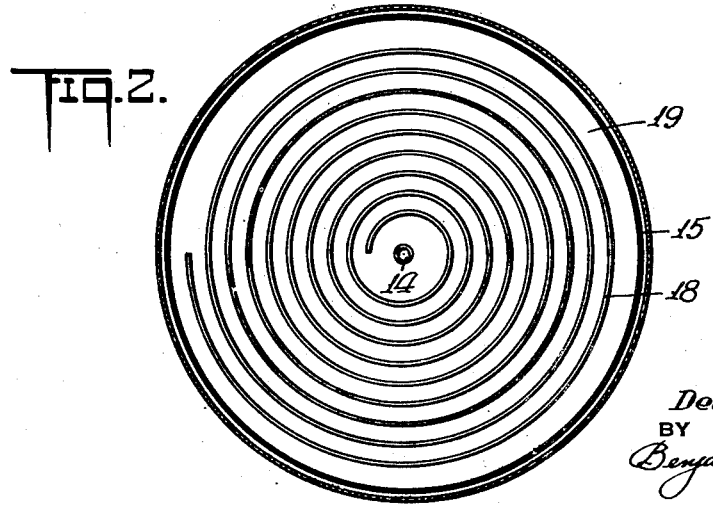
Figure 2 is a horizontal section taken in a plane passing through line 2—2 of Figure 1.
Figure 3:
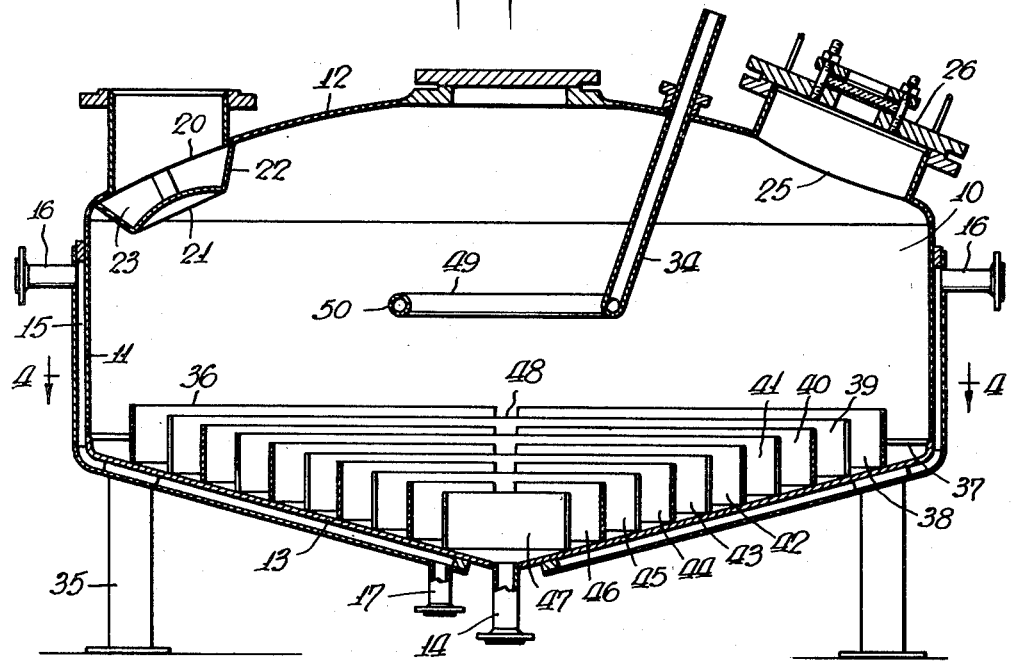
Figure 3 is a vertical section through a modified form of still embodying this invention.
Figure 4:
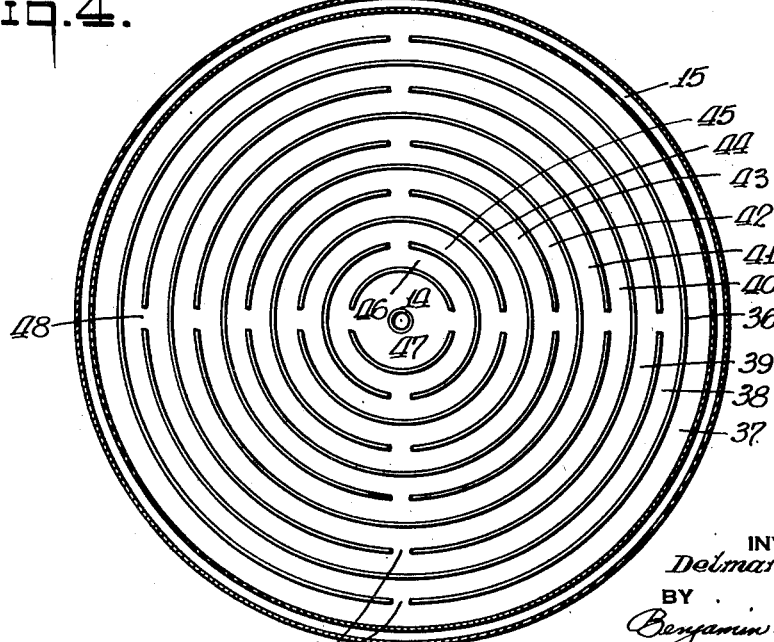
Figure 4 is a horizontal section taken in a plane passing through line 4—4 of Figure 3.

Parts of Figures 3 and 4 the same as those of Figures 1 and 2 have been given the same reference characters. In the modification of Figures 3 and 4, instead of a continuous helical baffle 18 as in Figures 1 and 2, a series of semi-cylindrical baffles 36 have their edges welded to the inclined bottom in spaced relation to form concentric cylindrical paths 37 to 47, inclusive, interconnected by openings or channels 48. The channels or openings 48 in adjacent concentric baffles are staggered, for example, as shown in Figure 4 they may be spaced 90° apart, thus forming an extended path of travel from the side wall 11 to the central opening 14 through which the unvaporized distilland flows before reaching this opening.

A cylindrical spray pipe 49 provided with nozzles 50 communicates with the liquid supply pipe 34. This spray pipe projects a spray of distilland through the nozzles 50 on to the heated side walls 11 near the top of the jacketed portion of these walls, the distilland being introduced preferably preheated and under sufficient pressure to be atomized to form a curtain extending completely across the cross-sectional area of the top of housing 10 striking the heated side walls 11 near the top of the jacketed portion.

It will be noted that this invention provides an exceptionally long heated path along the bottom through which unvaporized material flows before reaching the outlet 14. This promotes most efficient use of the available heating area with consequent increase in the capacity of the still. It will be further noted a minimum pressure drop takes place in the operation of the still, the vapor velocities are relatively low in view of the exceptionally large cross sectional area of the still with consequent minimum entrainment, and the desired vapors are exposed to the elevated temperatures within the still for an exceptionally short period of time in view of the short unobstructed path through which the vapors flow minimizing undesired decomposition thereof.

Since different embodiments of this invention can be made without departing from the scope of this invention it is intended that all matter contained in the above description or shown in the accompanying drawings shall be interpreted as illustrative and not in a limiting sense. Thus, for example, the housing may have a concave bottom instead of the conical bottom shown. Instead of the distributors disclosed other spraying, atomizing, or analogous devices may be used for introducing the distilland to uniformly distribute same through the upper portion of the housing. Also, if desired, one or more baffles designed to provide large openings for flow of the vapors therethrough, which baffles do not seriously increase entrainment of liquid by the vapor stream, vapor velocity and pressure drop may be positioned into the otherwise unobstructed space below the distributor. For example, a baffle may be provided just below the distributor 33 to prevent liquid from flowing directly downwardly to the central portion of the conical bottom and for causing such liquid to flow towards the side walls. As above indicated, however, it is preferred to have the space below the distributor and above the conical bottom completely unobstructed.

What is claimed is:

1. A high vacuum substantially unobstructed path distillation still comprising a squat cylindrical housing having vertical side walls and an inclined bottom extending from the vertical side walls to a central outlet disposed at the center of said bottom, said housing having a diameter at least twice as great as the vertical height of said side walls, a rotatable distributor positioned near the top of said housing centrally disposed with respect to the side walls of said housing, means for supplying distilland to said distributor, means for rotating said distributor to distribute the distilland substantially uniformly throughout the upper portion of said housing to form a curtain of distilland extending throughout substantially the entire cross sectional extent of the upper portion of said housing and into contact with the upper portion of said side walls, a heating jacket for heating the side walls and bottom of said housing, a helical baffle on the inclined bottom of said housing to provide an extended heated path leading from the side walls to said central outlet for flow through said heated path of unvaporized distilland to effect vaporization thereof, the vapors produced by the vaporization of said distilland travelling through the relatively short vertical path provided by said housing and being scrubbed and fractionated as they pass through said curtain of distilland, the interior of said housing above said helical baffle and below said distributor being devoid of obstructions to the flow of vapors generated in said housing, the top of said housing being provided with a vapor outlet, a baffle in said housing positioned in front of said vapor outlet just below said outlet and above said distributor and also above the said curtain of distilland, and means for removing vapor including a vacuum pump communicably connected with said vapor outlet.

2. A high vacuum substantially unobstructed path distillation still comprising a squat cylindrical housing having vertical side walls and a conical bottom extending from the vertical side walls to a central outlet disposed at the apex of said conical bottom, the angle of inclination of said conical bottom being less than 30° to the horizontal, said housing having a diameter at least twice as great as the vertical height of said side walls, means for supplying distilland to the upper portion of said housing, means for distributing said distilland to form a curtain of distilland extending throughout substantially the entire cross sectional extent of the upper portion of said housing and into contact with the upper portion of said side walls, a heating jacket for heating the side walls and base of said housing, elongated upstanding baffle means on the conical bottom to provide an extended heating path leading from the side walls to said central outlet for flow through said heated path of unvaporized distilland to effect vaporization thereof, the vapors produced by the vaporization of said distilland travelling through the relatively short vertical path provided by said housing and being scrubbed and fractionated as they pass through said curtain of distilland, the interior of said housing above said baffle means and below said distributor being devoid of obstructions to the flow of vapors generated in said housing, the top of said housing being provided with a vapor outlet, a baffle in said housing positioned in front of said vapor outlet just below said outlet and above said distributing means and also above said curtain of distilland, and means for removing vapor including a vacuum pump communicably connected with said vapor outlet.

DELMAR A. FEIL.

REFERENCES CITED

The following references are of record in the file of this patent:

UNITED STATES PATENTS

| Number | Name | Date |
|---|---|---|
| 1,277,931 | Heuser | Sept. 2, 1918 |
| 2,117,803 | Hickman | May 17, 1938 |
| 2,379,151 | Hickman | June 26, 1945 |

FOREIGN PATENTS

| Number | Country | Date |
|---|---|---|
| 16,805 of 1887 | Great Britain | Oct. 12, 1888 |
| 424,990 | France | Mar. 26, 1910 |
| 14,904 | France | Dec. 27, 1910 |
| | (First addition to 424,990) | |
| 460,532 | Great Britain | Jan. 29, 1937 |